United States Patent [19]

Bailly-Salins

[11] Patent Number: 4,666,296
[45] Date of Patent: May 19, 1987

[54] VELOCITY INTERFEROMETER WITH CONTINUOUSLY VARIABLE SENSITIVITY

[75] Inventor: René Bailly-Salins, Dijon, France

[73] Assignee: Commissariat a l'Energie Atomique, France

[21] Appl. No.: 691,069

[22] Filed: Jan. 14, 1985

[30] Foreign Application Priority Data

Jan. 20, 1984 [FR] France ............................ 84 00879

[51] Int. Cl.[4] .................. G01P 3/36; G01C 3/08; G01C 3/00; G01B 11/02
[52] U.S. Cl. ............................. 356/28.5; 356/5; 356/4; 356/4.5; 356/358
[58] Field of Search ............... 356/28.5, 4, 5, 345, 356/346, 347, 28, 358, 4.5; 73/656, 657

[56] References Cited

U.S. PATENT DOCUMENTS

| | | | |
|---|---|---|---|
| 3,487,227 | 12/1969 | Kingly | 356/358 |
| 3,744,909 | 7/1973 | Bruce | 356/345 |
| 4,310,245 | 1/1982 | Pritchard | 356/345 |
| 4,385,835 | 10/1983 | Westerberg | 356/358 |
| 4,522,495 | 6/1985 | Shajenko | 356/345 |

FOREIGN PATENT DOCUMENTS 2540984 3/1977 Fed. Rep. of Germany.
2818166 8/1979 Fed. Rep. of Germany.

OTHER PUBLICATIONS

Smeets & George, "Michelson Spectrometer for Instantaneous Doppler Velocity Measurements," *J. Phys. E.: Sci. Instrum*, vol. 14, No. 7, (Jul.), 1981 pp. 838–845.

Primary Examiner—Stephen C. Buczinski
Assistant Examiner—Melissa L. Koltak
Attorney, Agent, or Firm—Cesari and McKenna

[57] ABSTRACT

A velocity interferometer has a continuously variable sensitivity and is particularly applicable to the study of the movement of reflecting polished surfaces or backscattered rough surfaces. The interferometer is a Michelson interferometer with a widened field comprising in a per se known manner a light splitter and two light reflectors, one of which is associated with a medium having parallel faces. The medium is constituted by a fluid in which the associated reflector is immersed and displaceable in translation parallel to the path of the light falling on it, the other reflector also being displaceable in translation parallel to the path of the light falling thereon.

7 Claims, 6 Drawing Figures

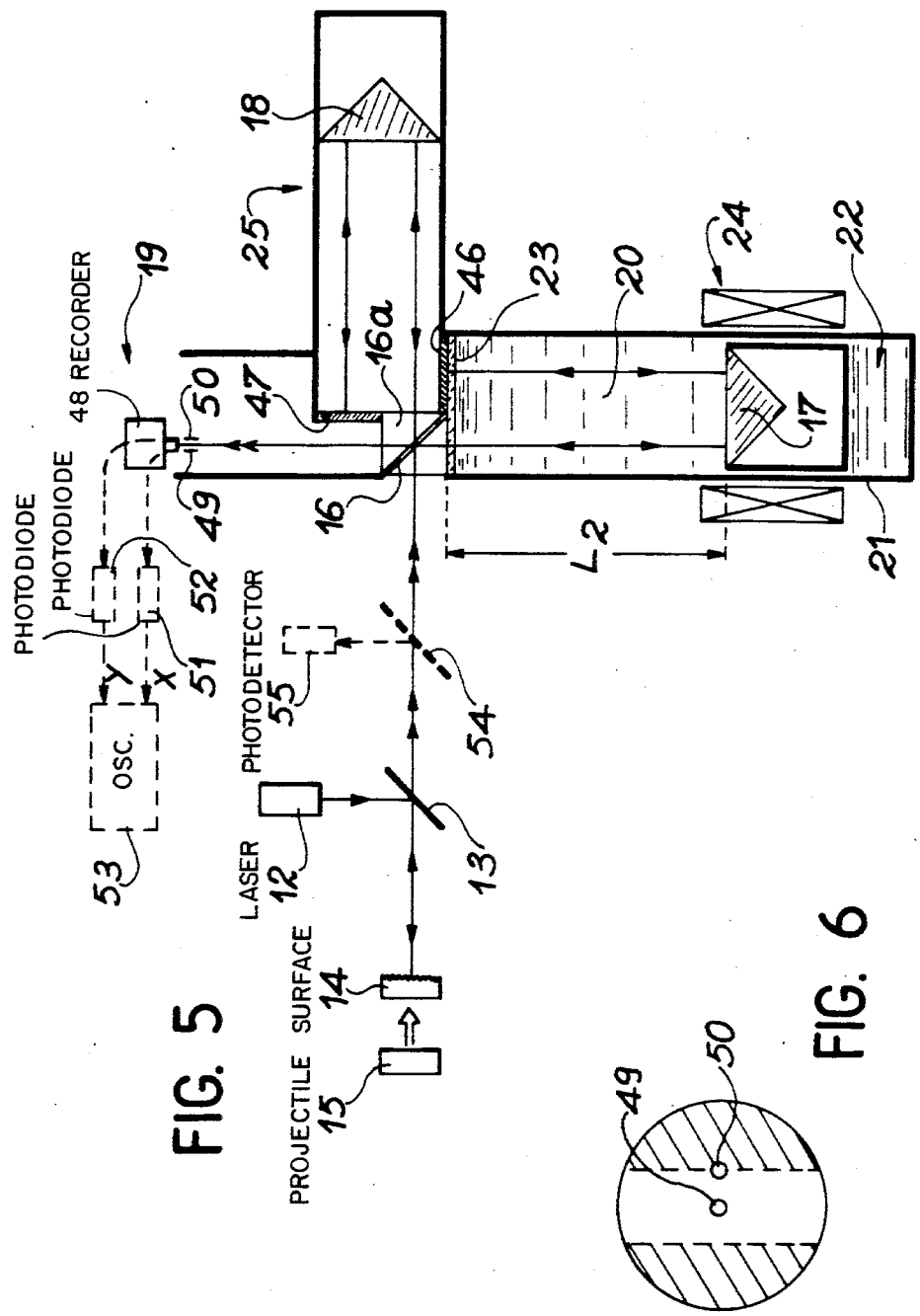

VELOCITY INTERFEROMETER WITH CONTINUOUSLY VARIABLE SENSITIVITY

BACKGROUND OF THE INVENTION

The present invention relates to a velocity interferometer with continuously variable sensitivity. It is applicable to the study, without mechanical contact, of the movement of an optically reflecting surface or a rough surface able to back scatter an incident light beam. It makes it possible to carry out measurements, even when the state of the investigated surface evolves under a mechanical action (stress, shock) or chemical action (phase change, oxidation).

Velocity interferometers are known called "wide angle MICHELSON interferometers" or "widened field interferometers", which make it possible to perform such measurements. One exemplified construction of such interferometers is diagrammatically shown in FIG. 1. It essentially comprises a laser 2 transmitting, via an e.g. semi-transparent mirror 3, a light beam onto a diffusing surface 4 to be investigated, which can e.g. be moved with the aid of a projectile 5. A beam splitting means 6, which traps the light reflected by the surface illuminated by the light beam, reflects one part thereof and transmits the other part. A first mirror 7 reflects in the direction of the splitting means 6 the light reflected by the same and then transmits the other part. A second mirror 8 reflects in the direction of the splitting means 6, the light transmitted by the same and reflects the other part. There are means 9 for the detection of the interferences resulting from the superimposing of the light from the splitting means 6 after reflection on the first mirror 7 and the light from the splitting means 6 after reflection on the second mirror 8. There is a glass block 10 with parallel faces of length or more accurately thickness L (distance between two parallel faces) and optical index n, interposed between the splitting means 6 and the second mirror 8, the distance from the first mirror 7 to the splitting means 6 being equal to the distance between the latter and the apparent position 11, viewed from detection means 9, of the second mirror 8.

Such an interferometer suffers from the following disadvantages. In order to have a high sensitivity, it is necessary to have a glass block 10 of considerable length (e.g. approximately 1.50 m for detecting velocity variations $\Delta V$ less than 30 m/s), which is difficult and costly. In addition, the sensitivity of the interferometer is fixed once and for all by the choice of a glass block, bearing in mind the following relation:

$$\Delta V = \tfrac{1}{2}\lambda_0 c \, L^{-1}(n-1/n)^{-1} \quad (1)$$

in which $\lambda_0$ and c respectively designate the emission wavelength of laser 2 and the velocity of light in vacuo.

SUMMARY OF THE INVENTION

The object of the present invention is to obviate these disadvantages.

The invention specifically relates to a velocity interferometer for determining the time evolution of the velocity of an optically reflecting or back scattering surface and which comprises:

a monochromatic, time-coherent light source, arranged so as to transmit a light beam onto the surface to be studied, a light beam splitting means arranged so as to receive the light thrown back by the surface, while transmitting one part thereof and reflecting the other part, a first light reflection means for receiving the part reflected by the splitting means and for reflecting it in the direction of the latter, so that it transmits part thereof, a second light reflection means for receiving the part transmitted by the splitting means and for reflecting it in the direction of the latter, in order that it reflects part thereof, so as to bring about interference between the transmitted part of the light reflected by the first reflection means and the reflected part of the light reflected by the second reflection means, means for detecting the interferences resulting therefrom and, a medium with parallel faces located on the path of the light propagated between the splitting means and one of the reflection means and which serves to delay said light with respect to the light propagating between the splitting means and the other reflection means, the latter being made to coincide with the image of the reflection means associated with said medium, given by the latter and the splitting means, wherein the medium with parallel faces is realized with the aid of a fluid in which said reflection means associated with the medium is immersed and displaceable in translation parallel to the path of the light falling thereon and coming from the splitting means and wherein said other reflection means is displaceable in translation parallel to the path of the light falling thereon and coming from the splitting means.

The term fluid is understood to mean a liquid or a gas, other than air and preferably under pressure.

In view of the nature of the medium with parallel faces used by it, the interferometer according to the invention is much simpler and less costly to produce than the aforementioned known interferometer. In addition, the interferometer according to the invention has a continuously variable sensitivity because, according to relation (1), said sensitivity is a function of the thickness of the fluid interposed between the reflection means associated therewith and the splitting means. This thickness is regulatable, because the reflection means immersed in the fluid is displaceable. The mobility of the other reflection means makes it possible to make the latter coincide with the image of the reflection means associated with the fluid given by the latter and the splitting means.

The interferometer according to the invention makes it possible to record velocity variations between a few meters per second and the speed of light, but the measurement dynamics remains linked with the detection means and the geometry of the interferometer chosen by the experimenter. This interferometer can be used in the following fields:

study of fast transient or oscillatory movements (e.g. pistons, valves), study of the deformation of structural components under dynamic loading, ballistic study (movement of a projectile, its launcher or the associated target), study of mechanical or thermal stress waves under elastic or plastic operating conditions with or without fracture under the effect of compression, expansion or tension, study of the separation of thick or thin layers in composite materials as well as in electronic components and circuits, study of the shock waves produced by explosives or plate projections, study of thermal shocks (interaction of photons or particles with the matter) and optionally in astrophysics.

According to a preferred embodiment of the interferometer according to the invention, each of said first and second reflection means comprises a catadioptric system, i.e. a device able to reflect a light beam in the incidence direction thereof, no matter what the said direction. The interferometer according to the invention can then also comprise a first light reflector and a second light reflector, each of them being positioned, with respect to the splitting means and the corresponding catadioptric system, in such a way that the light from the splitting means and which falls on the corresponding catadioptric system is reflected by the latter in the direction of the corresponding reflector and is then reflected by the latter in such a way that it returns towards the splitting means following the path taken by it when it passed from the splitting means to the corresponding reflector.

Preferably, the interferometer according to the invention is produced in such a way that the fluid medium with parallel faces is traversed by vertical light rays.

Preferably, the light source comprises a laser, whose lighting power is such that the flux of light traversing through the fluid medium with parallel faces is at the most equal to 50 mW/cm$^2$.

Finally, according to an advantageous embodiment, the detection means comprise a cinematographic recorder or three photodetectors, one controlling the light intensity thrown back by the investigated surface and the other two respectively recording the light intensity at two points, in phase quadrature, of the interference field.

BRIEF DESCRIPTION OF THE DRAWINGS

The invention is described in greater detail hereinafter relative to non-limitative embodiments and the attached drawings, wherein show:

FIG. 5 a diagrammatic view of another special embodiment of the interferometer according to the invention.

FIG. 6 an enlargement of the field of interference fringes which can be observed as a result of the interferometer according to FIG. 5.

DETAILED DESCRIPTION OF THE PREFERRED EMBODIMENTS

Figure 1:
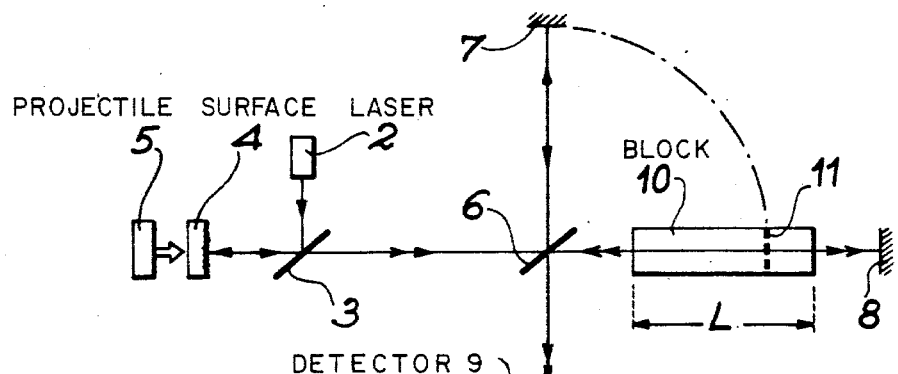
FIG. 1 a diagrammatic view of a known and already described velocity interferometer.
Figure 2:
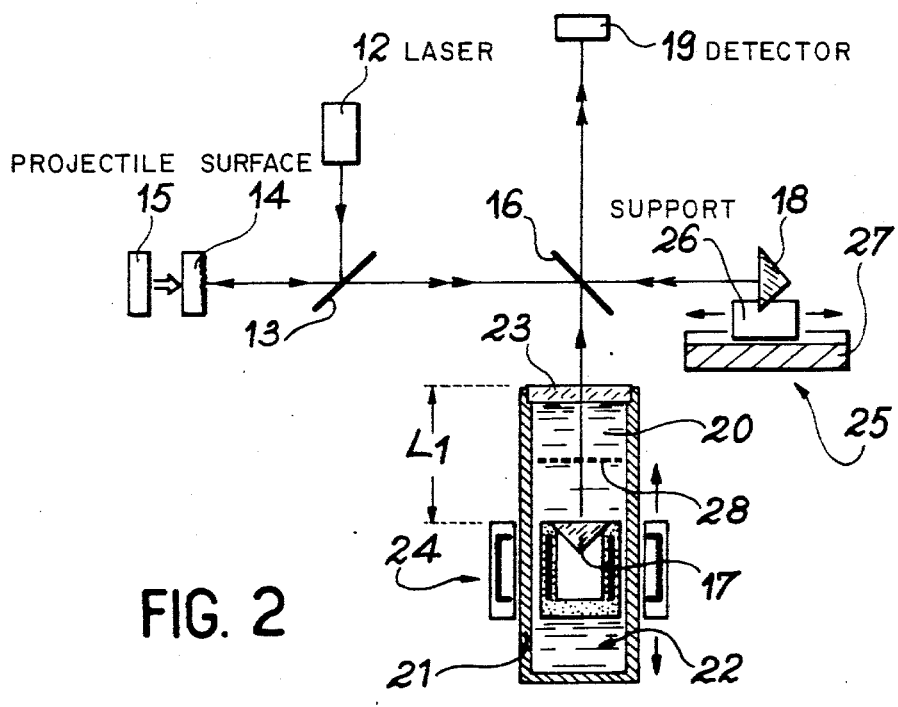
FIG. 2 a diagrammatic view of a special embodiment of the velocity interferometer according to the invention, incorporating a medium with parallel faces produced with the aid of a liquid column, as well as a reflection means displaceable in said liquid.

FIG. 2 diagrammatically shows a special embodiment of the interferometer according to the invention comprising:

a monochromatic, time-coherent light source formed by means of a laser 12 which, via an e.g. semi-transparent plate 13, transmits a light beam onto a rough surface 14, which is able to back scatter the same and which can be moved or deformed with the aid of e.g. projectile 15;

means 16 for splitting the light beam for receiving the light back scattered by the surface and for transmitting one part thereof and reflecting another part thereof;

a first means 17 for reflecting the light, which serves to receive the part reflected by the splitting means 16 and for reflecting it in the direction of the latter, which then transmits part thereof;

a second means 18 for the reflection of light for receiving the part transmitted by the splitting means 16 and for reflecting it in the direction of the latter, which then reflects part thereof, so as to bring about interference between the transmitted part of the light reflected by the first reflection means 17 and the reflected part of the light reflected by the second reflection means 18;

means 19 for detecting the resulting interferences; and a medium with parallel faces 20 located on the path of the light propagating between the splitting means 16 and the first reflection means 17 and which serves to delay said light, with respect to the light propagating between the splitting means 16 and the second reflection means 18.

Each of the said first and second reflection means 17, 18 e.g. comprises a plane mirror oriented so as to receive, under normal incidence, the light reaching it from the splitting means 16, but is preferably realised with the aid of a catadioptric system, such as a transparent cube wedge. (The term cube wedge is understood to mean a tetrahedron, whose three faces are isosceles rectangular triangles, said wedge being oriented in such a way that the light reaching it from the splitting means 6 falls on its fourth face).

The first reflection means 17 is placed in a tank 21 filled with a liquid 22 and displaceable in translation parallel to the path of the light falling on it from the splitting means 16. The medium with parallel faces 20 is thus formed by the thickness of liquid 22 between the first reflection means 17 and the surface of the liquid facing the splitting means 16. This liquid surface is made flat by sealing tank 21 with the aid of a transparent plate 23 in contact with the liquid, which has the same optical index as the latter and which is perpendicular to the path of the light falling on the first reflection means 17. The mobility of the first reflection means within the liquid is ensured by displacement means 24, e.g. of the magnetic type and which will be described with reference to FIGS. 3 and 4.

The second reflection means 18 is also displaceable in translation parallel to the path of the light falling on it and coming from the splitting means 16. The translation of the second reflection means 18 is brought about with the aid of other displacement means 25 incorporating a support 26 to which the second reflection means 18 is fixed and which is displaceable in an e.g. dovetail slide 27.

The first reflection means 17 is regulated in such a way as to obtain the desired sensitivity for the interferometer according to the invention, bearing in mind relation (1) in which the variable L in this case assumes the value $L_1$ (thickness of the liquid between the first reflection means 17 and the liquid surface facing the splitting means 16, plus the thickness of plate 23) and the second reflection means 18 is then displaced in such a way that the distance thereof from the splitting means 16 is equal to the distance of the latter at the apparent position 28, viewed from the detection means 19, from the first reflection means 17.

A change in the sensitivity leads to a resetting of the position of reflection means 17 and 18 and also the orientation thereof when they are mirrors. The interest of using a catadioptric system in place of mirrors is that they are not sensitive to rotations (obviously of sufficiently small amplitudes), which obviates the need for said orientation resetting.

For example, the liquid used is xylene, whose optical index is equal to 1.48 and the laser is e.g. an ionized argon laser, whose emitted light is filtered to obtain a monofrequency radiation of wavelength 0.488 μm. Preferably, the power of the laser is chosen in such a way that the light flux traversing the liquid is at the most equal to 50 mW/cm$^2$ in order to obtain a stable transverse configuration of the field of interference fringes. Moreover, in order to further reduce the transverse temperature gradients in the liquid, i.e. perpendicular to the light propagation therein, the tank 21 is positioned vertically and the various components of the interferometer according to the invention are appropriately arranged in such a way that the first reflection means 17 receives, under a vertical incidence, the light from the splitting means 16.

Figure 3:
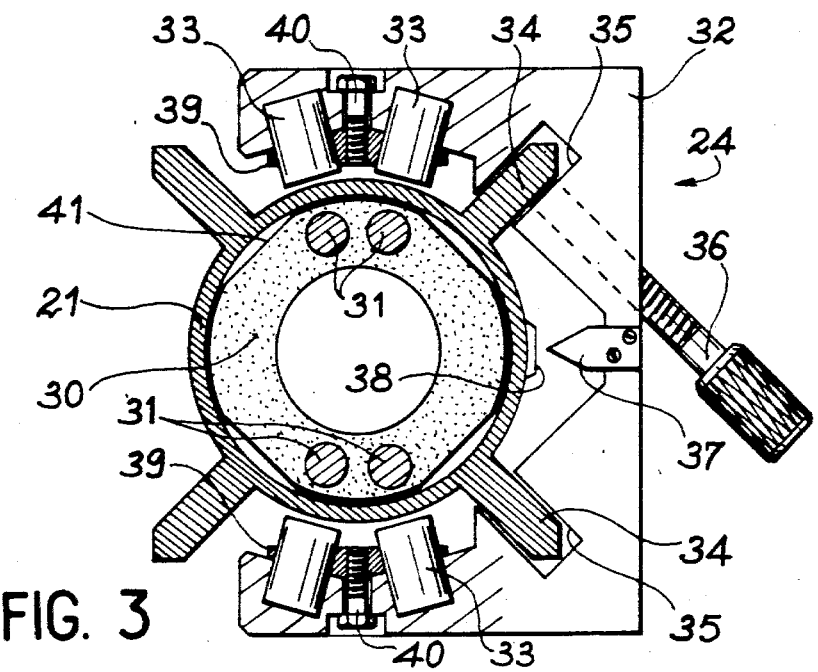
FIGS. 3 and 4 diagrammatic views of displacement means for said reflection means.
Figure 4:
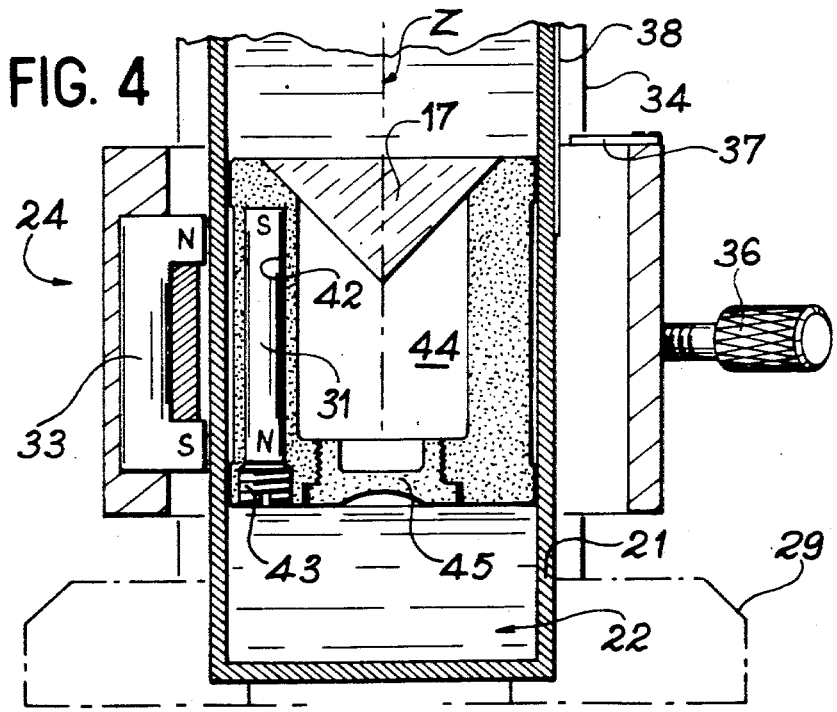

FIGS. 3 and 4 diagrammatically show respectively in transverse and longitudinal sections, the means 24 for displacing the first reflection means 17. Tank 21 is in the form of a tube made from a non-magnetic material such as aluminium and which is closed in its lower part, which is mounted on a base 29. The said displacement means 24 are of the magnetic type and essentially comprise a support 30 mobile in tube 21 and provided with permanent magnets 31 and to which is fixed the first reflection means 17, together with a carriage 32 movable outside tube 21, positioned facing support 30 and also provided with permanent magnets 33 facing magnets 31, in such a way that the displacement of carriage 32 brings about the displacement of support 30.

According to a preferred embodiment, tube 21 is provided with external longitudinal blades 34. The carriage 32 is provided with slots 35 enabling it to slide on the blades 34, a locking screw 36 for immobilizing it at a given level of tube 21 and a pointer 37 for indicating said level, whereby a graduated scale member 38 can then be longitudinally fixed to tube 21, in such a way that the pointer moves along said scale. The carriage has ends which are diametrically opposed with respect to tube 21. The magnets 33 are U-shaped magnets of the same length and are distributed into two groups, each group comprising two elongated U-shaped magnets, which are juxtaposed and parallel to the tube axis Z on a magnet holder 39, which is itself fixed to one of the ends of carriage 32 with the aid of a screw 40. The ends of the U-shaped magnets are bent and turned towards tube 21. Support 30 slides in tube 21 and has external flats 41 permitting the passage of liquid 22 between support 30 and tube 21. Support 30 is made from a non-magnetic material and is able to reduce friction against the tube, polytetrafluoroethylene being an example of such a material. The magnets 31 of support 30 are rod magnets of the same length and parallel to the axis Z of the tube, each of them being held in said support and are magnetically coupled to one of the U-shaped magnets (the north and south poles of one respectively facing the south and north poles of the other).

For example, the magnets 31 are arranged in recesses 42 made in support 30. It is possible to provide recesses 42 parallel to axis Z issuing at the bottom of support 30 and to close them at the bottom with the aid of plugs 43 made from the same material as support 30 and enabling the magnets 31 to be held in these recesses 42.

When tank 21 is vertical, the support 30 can have a cavity 44 issuing into the bottom of support 30 and which is closed at the bottom by a sealing plug 45, permitting a possible introduction of liquid into cavity 44, so as to give support 30 a zero buoyancy.

FIG. 5 diagrammatically shows another embodiment of the interferometer according to the invention. The only difference between this embodiment and that described with reference to FIG. 2 is that it also comprises a first light reflector 46 and a second light reflector 47 consisting e.g. of plane mirrors. The first mirror 46 is located at the top of tank 21 parallel to the first catadioptric system 17 and in such a way that the light from the splitting means 16 and which reflects on the first catadioptric system 17 reaches the first mirror 46, is reflected on the latter and returns to the splitting means 16 following the same path in the opposite direction.

The second mirror 47 is arranged parallel to the second catadioptric system 18 and in such a way that the light from the splitting means 16 and reflecting on the second catadioptric system 18 reaches the second mirror 47, is reflected on the latter and returns to the splitting means 16 following the same path in the opposite direction.

The splitting means 16 is, for example, a splitter cube 16a. The interferometer according to the invention can then be constructed in such a way that its arms 16, 17 and 16, 18 are perpendicular, the cube 16a being in contact by an appropriate face with half of plate 23, the first mirror 46 being in contact with the other half of plate 23 and the first catadioptric system having an adequate size to face both the cube 16a and the first mirror 46. The second mirror 47 is then contiguous and parallel with another face of cube 16a, which corresponds to the second catadioptric system 18, which has an adequate size to face both cube 16a and the second mirror 47.

For example, the first mirror 46 can be obtained by depositing a reflecting coating on the other half of plate 23.

The interferometer of FIG. 5 makes it possible to cover a wide sensitivity range by displacing catadioptric system 17, 18 without touching mirrors 46, 47, the path of the light in the liquid being equal to $2L_2$, in which $L_2$ represents the thickness 20 of the liquid. With a liquid such as xylene of optical index 1.48, a useful length $L_2$ of 76 cm and the 0.488 μm line of an ionized argon laser, it is possible to measure velocity variations exceeding 30 m/s.

Obviously, as in the case of the interferometer described with reference to FIG. 2, the second catadioptric system 18 is still regulated in such a way that the distance between it and the splitting means 16 is equal to the distance between the latter and the apparent position, viewed from detection means 19 of the first catadioptric system 17.

The detection means 19 (FIGS. 2 and 5) can comprise a cinematographic recorder 48 for filming the time evolution of the field of interference fringes formed in the interferometer, which makes it possible to determine, as a function of time t, the velocity V(t) of the surface 14 with its sign changes, without introducing any error due to variations of the light intensity back scattered by surface 14.

This result can also be obtained with the aid of two photoelectric detectors, by recording therewith two phase-displaced signals, e.g. in phase quadrature, and by optionally measuring the light intensity back scattered by surface 14. For this purpose, the detection means 19 comprise two optical fibres 49, 50 (e.g. of silica and of diameter 1 mm), which are arranged in such a way that two respective ends of these fibres observe the light interferences formed in the interferometer at two points in phase quadrature. This is shown in FIG. 6, where it is possible to see an enlargement of the field of interference fringes. The end of fibre 49 is centered on a bright fringe, whilst the end of fibre 50 is at the limit of a bright fringe and a dark fringe. These fibres are also respectively connected by their other ends to two photodiodes 51, 52, which are themselves respectively connected to the inputs X and Y of an oscilloscope 53 working in the scanning mode XY. It is possible to see on the oscilloscope screen, signals $I_X$ and $I_Y$ corresponding to the light trapped by the fibres and the angle between the mirrors 46, 47 is regulated until these signals are in phase quadrature (an ellipse appearing in this case on the oscilloscope screen). This is followed by passing from scanning mode XY to mode X(t) and Y(t).

There is also a check of the light intensity $I_0$ back scattered by surface 14 when said intensity fluctuates (which is generally the case), with the aid of semi-transparent mirrors 54 which sample part thereof and a photodetector 55 which traps said part.

Obviously, instead of placing the liquid medium with parallel faces between the first reflection means and the splitting means, as is the case in FIGS. 2 and 5, it can be placed between the second reflection means and the splitting means, the second reflection means then being placed in the tank and the displacement means 24 and 25 are then switched over (and by regulating the first reflection means in such a way that its distance from the splitting means is equal to the distance between the latter and the apparent position, viewed from the detection means from the second reflection means).

What is claimed is:

1. A velocity interferometer for determining the time evolution of the velocity of an optically reflecting or back scattering surface and which comprises:
    a monochromatic, time-coherent light source, arranged so as to transmit a light beam onto the surface to be studied,
    a light beam splitting means arranged so as to receive the light thrown back by the surface, while transmitting one part thereof and reflecting the other part,
    a first light reflection means for receiving the part reflected by the splitting means and for reflecting it in the direction of the latter, so that it transmits part thereof,
    a second light reflection means for receiving the part transmitted by the splitting means and for reflecting it in the direction of the latter, in order that it reflects part thereof, so as to bring about interference between the transmitted part of the light reflected by the first reflection means and the reflected part of the light reflected by the second reflection means,
    means for detecting the interferences resulting therefrom, and
    a medium with parallel faces located on the path of the light propagated between the splitting means and one of the reflection means and which serves to delay said light with respect to the light propagating between the splitting means and the other reflection means, the latter being made to coincide with the image of the reflection means associated with said medium, given by the latter and the splitting means, wherein the medium with parallel faces is realized with the aid of a fluid in which said reflection means associated with the medium is immersed and displaceable in translation parallel to the path of the light falling thereon and coming from the splitting means and wherein said other reflection means is displaceable in translation parallel to the path of the light falling thereon and coming from the splitting means.

2. An interferometer according to claim 1, wherein each of the first and second reflection means comprises a catadioptric system.

3. An interferometer according to claim 2, wherein it also comprises a first light reflector and a second light reflector, each of them being arranged with respect to the splitting means and the corresponding catadioptric means, in such a way that the light from the splitting means and falling on the corresponding catadioptric system is reflected by the latter in the direction of the corresponding reflector and is then reflected by the latter in such a way that it returns to the splitting means taking the path followed by it when it passed from said splitting means to the corresponding reflector.

4. An interferometer according to claim 1, wherein the fluid medium with parallel faces is traversed by vertical light beams.

5. An interferometer according to claim 1, wherein the light source comprises a laser, whose lighting power is such that the flux of the light passing through the fluid medium with parallel faces is at the most equal to 50 mW/cm$^2$.

6. An interferometer according to claim 1, wherein the detection means comprise a cinematographic recorder.

7. An interferometer according to claim 1, wherein the detection means comprise three photodetectors, one controlling the light intensity thrown back by the investigated surface and the two others respectively recording the light intensity at two points, in phase quadrature, of the interference field.

* * * * *